United States Patent [19]

Herlitz et al.

[11] Patent Number: 4,540,213
[45] Date of Patent: Sep. 10, 1985

[54] VEHICLE CARGO ORGANIZER ASSEMBLY

[75] Inventors: John E. Herlitz, Farmington Hills; Carl A. Cameron, Detroit, both of Mich.

[73] Assignee: Chrysler Corporation, Highland Park, Mich.

[21] Appl. No.: 545,831

[22] Filed: Oct. 27, 1983

[51] Int. Cl.³ .............................................. B60R 11/00
[52] U.S. Cl. .................... 296/37.5; 296/37.16; 224/42.42; 224/311; 248/97; 211/195; 220/6
[58] Field of Search ............... 296/37.1, 37.5, 37.8, 296/37.6, 37.16; 224/42.01, 42.42, 42.45 R, 273, 311; 248/95, 97; 220/6, 19; 211/13, 171, 195

[56] References Cited

U.S. PATENT DOCUMENTS

| | | | |
|---|---|---|---|
| 1,824,288 | 9/1931 | Meyer | 224/42.42 R |
| 2,293,646 | 8/1942 | Haas et al. | 220/6 |
| 2,554,776 | 5/1951 | Comeau | 224/42.42 R |
| 3,251,504 | 5/1966 | Sankey | 220/19 |
| 4,189,056 | 2/1980 | Majewski | 211/195 |
| 4,226,348 | 10/1980 | Dottor et al. | 224/42.42 R |
| 4,305,519 | 12/1981 | Gerich | 224/42.42 |
| 4,372,512 | 2/1983 | Wolfe | 224/42.42 |

FOREIGN PATENT DOCUMENTS 1044571 10/1966 United Kingdom ............... 296/37.1

Primary Examiner—Robert B. Reeves
Assistant Examiner—Dennis H. Pedder
Attorney, Agent, or Firm—Edward P. Barthel

[57] ABSTRACT

A motor vehicle cargo loading floor has a plurality of parallel slats extending longitudinally from a rear access opening. The slats, which normally serve as cargo skids, have their aft ends hinged to the floor about a common transverse axis adjacent the access opening. The forward ends of the slats are secured by a transverse cross-rail with support means adjacent each end of the rail. The hinged slats and cross-rail define a rack which may be pivoted upwardly and secured in a canted position by the support means free ends being secured to either side of the access opening. The canted rack defines a plurality of cargo receiving spaces which, upon the access door being closed, maintains cargo placed in the rack spaces in an upright manner during operation of the vehicle.

1 Claim, 2 Drawing Figures

VEHICLE CARGO ORGANIZER ASSEMBLY

BACKGROUND OF THE INVENTION

1. Field of the Invention

The present invention relates to cargo handling devices for vehicles, and more particularly to skid slats on a vehicle cargo floor which may also be used in a second cargo support mode to support packages in an upright manner during operation of the vehicle.

2. Description of the Prior Art

In the past, various package-holding arrangements have been proposed for holding cargo, such as bags of groceries upright during transit in vehicle cargo storage areas. As evidenced by U.S. Pat. Nos. 2,986,315; 3,043,411; 3,986,656; 4,029,244; 4,226,348; 4,189,056; and 4,372,512 many varities of removable or collapsible package supports have been used in vehicle cargo areas. While the above patented devices are acceptable to retain the cargo during turning, sudden stops etc., they require time to assemble and are expensive to manufacture. Further, these prior art devices are unsatisfactory because even if they are collapsible they must be stowed in the vehicle occupying valuable storage space.

SUMMARY OF THE INVENTION

It is, therefore, an object of this invention to provide a vehicle cargo organizer which provides for orderly loading of cargo such as grocery bags while insuring their retention during transit, sudden stops or the like.

It is another object of the invention to provide a vehicle cargo organizer which functions in one mode as cargo skid slats for loading cargo and in a second mode as a cargo organizer to support cargo against tipping over during transit.

To accomplish these and other objects of the invention, a preferred embodiment includes a plurality of substantially parallel slats extending longitudinally on the vehicle cargo floor from a rear access door opening, for example. The slats have their aft ends hinged to the floor for pivotal movement about a common transverse axis. A cross-rail connects the forward ends of the slats to define a storage rack. Each end of the cross-rail has a tie member, the free end of which is adapted to be secured to one side of the rear access door opening.

The rack normally provides cargo skids in its retracted position flush with the floor. The rack assembly assumes its cargo support mode upon being pivoted upwardly to a canted position and retained by the tie members which are readily attached to the vehicle body by hook members located on either side of the access opening. In its erected mode the rack assembly provides a cargo support with several cargo receiving spaces. Each rack space together with the closed liftgate is operative to maintain cargo placed therein in an upright position during operation of the vehicle.

DESCRIPTION OF THE PREFERRED EMBODIMENT

Figure 1:
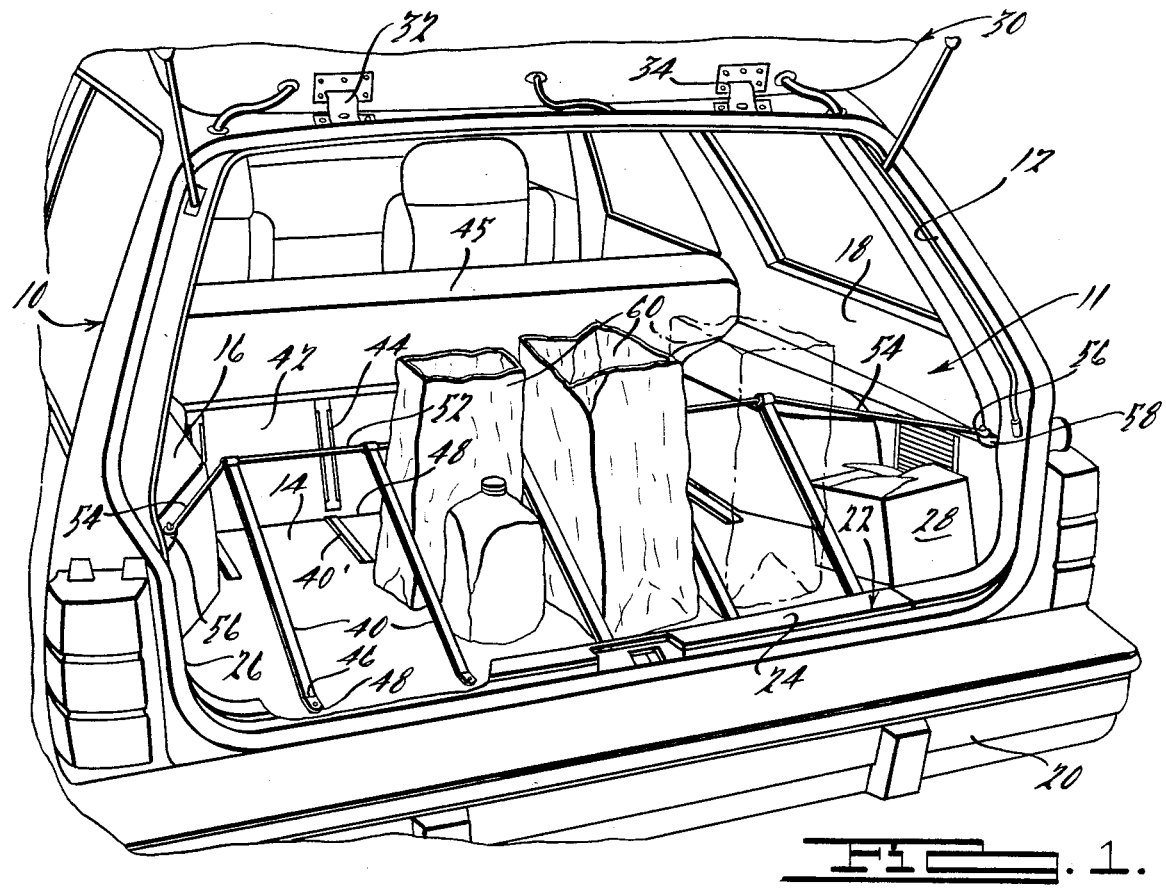
FIG. 1 is a perspective view, broken away, of a station wagon cargo organizer of the present invention shown in its raised cargo supporting position.

Referring now to FIG. 1, it will be seen that a partial rear view of a station wagon type vehicle body 10 is shown. The body has a rear cargo compartment 11 terminating in a rear access opening 12. The cargo compartment has a floor assembly or cargo panel 14 extending between a pair of interior trim side panels 16 and 18. The floor and side panels terminate at their rearward extremities at the access opening 12.

A back bumper structure 20 is mounted on the body 10 below and rearwardly of the opening 12. The bumper structure includes a generally horizontal sill panel assembly 22 extending between the opposite rear quarters of the body. The sill includes a horizontal panel 24 joined with a pair of vertical jam panels 26,28 to provide a mounting frame for door means such as a liftgate, partially indicated at 30.

The liftgate is pivotally mounted on the vehicle body by a pair of hinges 32 and 34 for swinging movement as a liftgate between its closed position and an upwardlyswing open position, (FIG. 1), about a generally horizontal axis.

Figure 2:
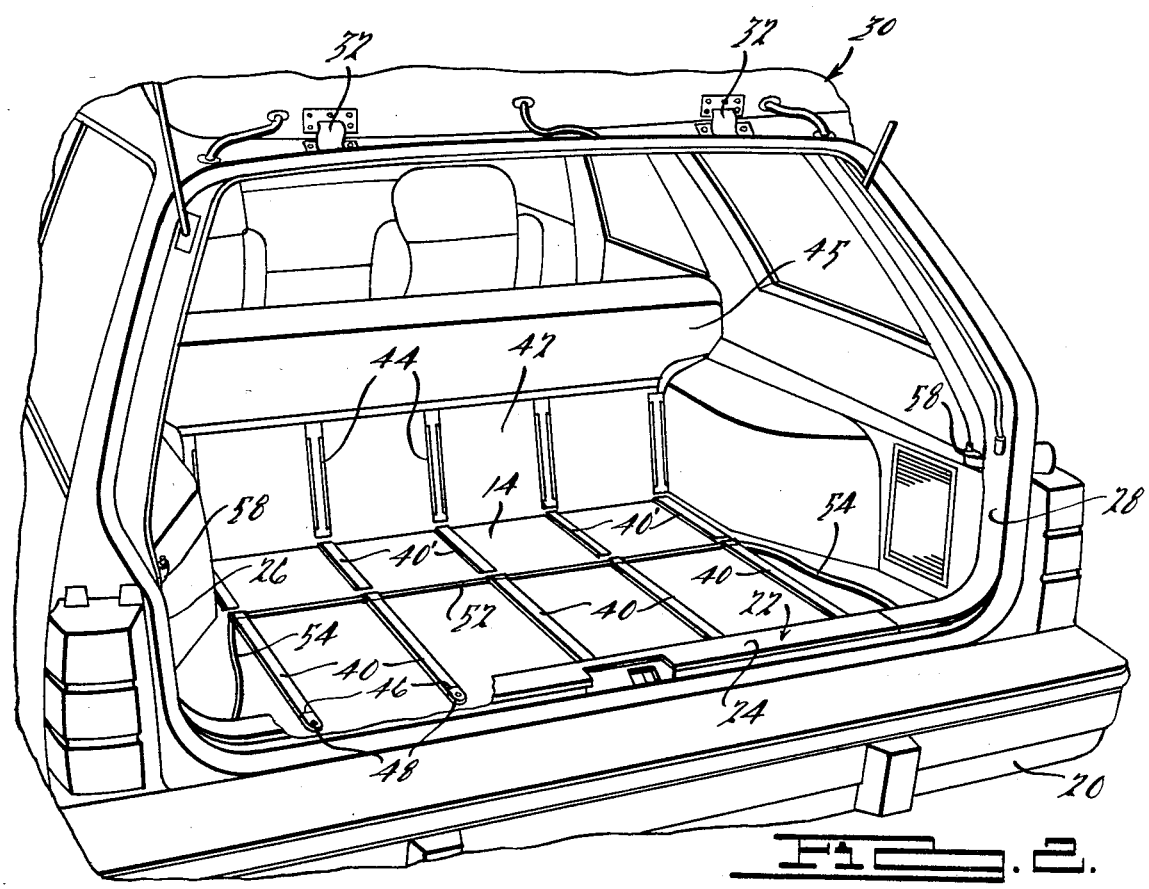
FIG. 2 is a view similar to FIG. 1 showing the organizer in its retracted mode providing skid slats for cargo.

As seen in FIG. 2, a cargo organizer for the station wagon is shown in its raised position. The organizer comprises a plurality of parallel cargo skid slats 40 located on the horizontally extending cargo floor or panel 14. In the form shown there are five metal slats 40 extending longitudinally from a movable forward floor panel 42 shown in its raised position. The panel 42, which has slats 44 fixed thereto, forms a continuation of the cargo floor or panel surface when rear seat back 45 is folded forward onto the rear seat cushion.

The slats 40 are fixedly secured to the cargo floor adjacent the rear access opening by suitable hinge means 46 having one hinge leaf 48 thereof fixed to the rear cargo panel 14. Each of the hinge means 46 are aligned on a common transverse pivotal axis. It will be understood that the hinge means could be individual pinned leaf hinges or a flexible arrangement wherein each hinge element is composed of a flexible material such as a plastic strap.

The plurality of slats 40 have their forward free ends connected together by a transverse cross-rail 52 defining a rack. Rack support means preferably in the form of flexible tie members 54, have one end fixed to each outboard end of the cross-rail. The free ends of the tie members are formed with loops 56 for ready attachment to L brackets 58 located on either side of the access opening. The rack support means, however, is not limited to the flexible tie members 54. It will be appreciated that rigid support struts could also be used, for example, without departing from the scope of the invention.

As seen in FIG. 2 the slats 40 and cross-rail 52 form a rack assembly which when retracted lies flush with the cargo floor panel 14. In its retracted mode the slats 40 serve as cargo skids in conjunction with their associated aligned cargo skid slats 40' fixed to the panel 14.

In its raised cargo organizer mode of FIG. 1 the rack is retained at a predetermined acute angle with the cargo floor of about 30° from the horizontal by means of the tie members 54 looped over brackets 56. The rack thus provides four compartments or rear opening spaces in which cargo such as the grocery bags 60 may be supported. The bags are adapted to contact the cross-rail 52 or adjacent slats 40 to prevent their tipping forward or sideways. By virtue of the novel arrangement of the disclosed embodiment the bags are prevented from tipping rearwardly by the liftgate 30 in its downwardly pivoted closed position.

It is understood that this invention is not limited to the exact construction illustrated and described above but that various changes and modifications may be made without departing from the spirit and scope of the invention as defined by the following claims.

What is claimed is:

1. In a motor vehicle having at least one seat, door means closing a generally rectangular rear access opening having top, bottom and side edges, a rear cargo compartment having a cargo floor extending from a location behind the rearmost seat to said access opening, at least a portion of said cargo floor spaced a predetermined longitudinal distance from said rear access opening having three or more longitudinally extending, equally spaced, substantially parallel forward cargo skid slat members fixedly secured thereto; each said forward cargo skid member having a generally flat rectangularly shaped cross-section, an equal number of identical, substantially parallel, equally spaced aft cargo skid slat members, each said aft cargo skid slat member having front and rear ends and normally extending longitudinally on said cargo floor said predetermined distance, each said aft cargo skid slat member aligned with an associated forward cargo skid slat member with its rear end adjacent said rear access opening bottom edge and its front edge juxtaposed an associated aligned forward cargo skid member rear edge, such that each said rear cargo skid slat member normally functions in association with its aligned forward cargo skid slat member to facilitate the movement of cargo into and out of said compartment rear access opening, hinge means pivotally supporting the rear end of each said aft cargo slat member at respective points on said floor such that said aft cargo skid slat members pivot about a common transverse axis, a transverse cross-rail interconnecting the front ends of each said aft cargo skid slat member, said cross-rail having a single flexible tie member connected at each end thereof, each said tie member having a loop formed at its free end, said aft cargo skid slat members and said cross rail defining a rack operable for pivotal movement about said transverse axis in an upward direction from said cargo floor, wherein each said tie member loop is adapted to be removably secured to its associated bracket member, said tie members holding said rack in a raised position with each said aft cargo skid slat member defining a predetermined acute angle with said cargo floor, whereby a cargo receiving space is provided between adjacent raised aft cargo skid slat members and said cross rail, said aft cargo skid slat members and said cross-rail together with said door means in its closed position operative to maintain cargo placed in said cargo receiving spaces in an upright position on said cargo floor during operation of the vehicle.

* * * * *